(12) United States Patent
Chen et al.

(10) Patent No.: US 6,483,293 B1
(45) Date of Patent: Nov. 19, 2002

(54) SYSTEM AND METHOD FOR CANCELLING THE EFFECTS OF STRAY MAGNETIC FIELDS FROM THE OUTPUT OF A VARIABLE RELUCTANCE SENSOR

(75) Inventors: Chingchi Chen, Ann Arbor, MI (US); Michael W. Degner, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 92 days.

(21) Appl. No.: 09/606,863

(22) Filed: Jun. 29, 2000

(51) Int. Cl.$^7$ .................................................. G01B 7/30

(52) U.S. Cl. ............................ 324/207.12; 324/207.25

(58) Field of Search ............................. 324/163, 174, 324/175, 207.25, 225, 207.12, 207.16, 166, 168; 73/356, 510, 514; 702/41

(56) References Cited

U.S. PATENT DOCUMENTS

| | | | | |
|---|---|---|---|---|
| 3,961,214 A | * | 6/1976 | Lokkart | 324/174 |
| 3,984,713 A | | 10/1976 | Presley | |
| 4,901,015 A | | 2/1990 | Pospischil et al. | |
| 5,373,234 A | | 12/1994 | Kulczyk | |
| 6,101,879 A | * | 8/2000 | Shirai et al. | 324/174 |

* cited by examiner

Primary Examiner—Walter E. Snow

(57) ABSTRACT

A sensor system for sensing a rotation of a sensing wheel is disclosed. The sensor system has a sensing coil in juxtaposition with the sensing wheel. Moreover, the sensing coil has a sensing coil output signal indicative of the rotational speed of the sensing wheel. Further, a cancellation coil is located remotely from the sensing coil and connected in series therewith. Additionally, the cancellation coil has a cancellation coil output signal indicative of an environmental disturbance which is effecting the sensing coil output signal. The cancellation coil output signal operates to cancel the effects of the environmental disturbance on the sensing coil output signal.

17 Claims, 3 Drawing Sheets

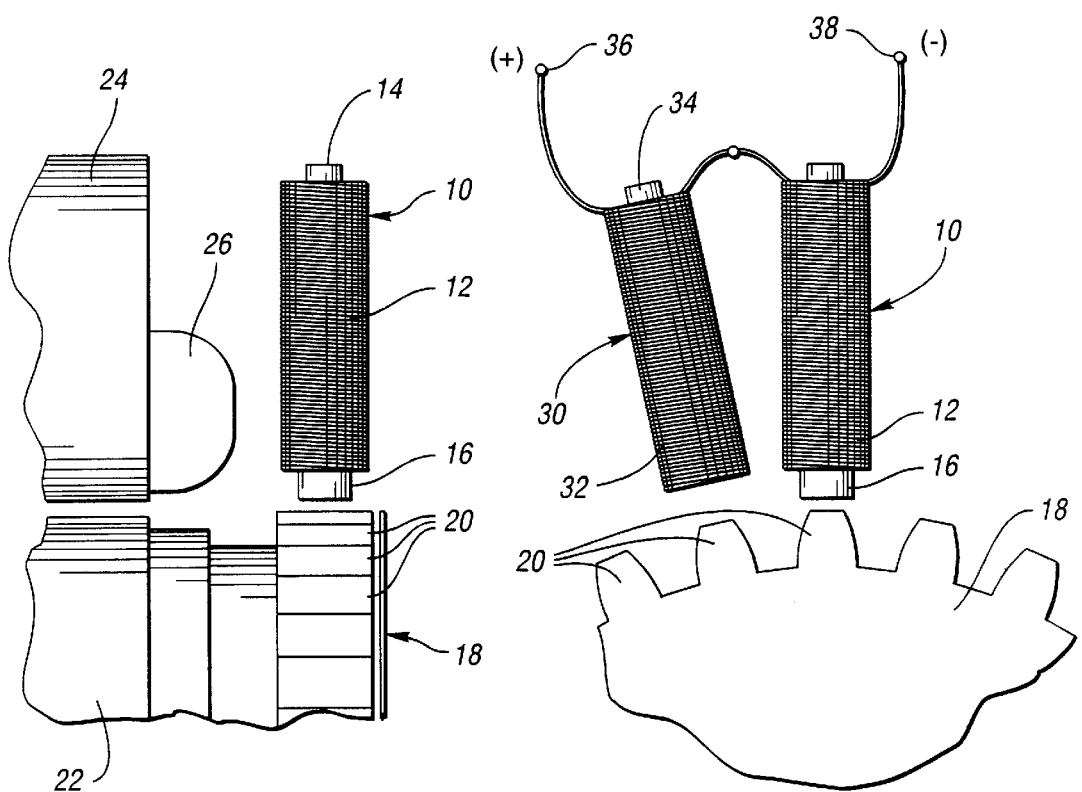
Fig. 1
Fig. 4
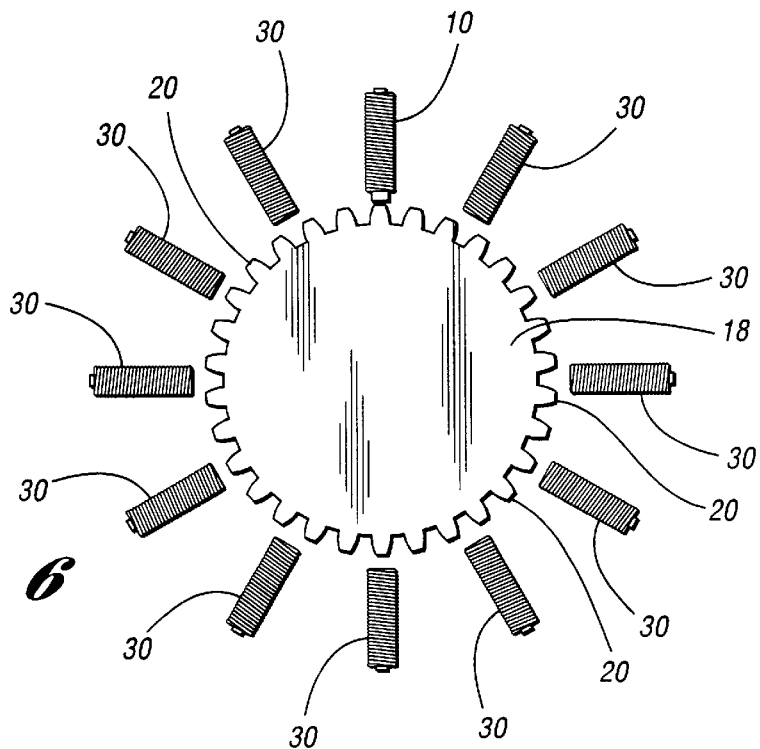
Fig. 6

SYSTEM AND METHOD FOR CANCELLING THE EFFECTS OF STRAY MAGNETIC FIELDS FROM THE OUTPUT OF A VARIABLE RELUCTANCE SENSOR

GOVERNMENT RIGHTS

The U.S. Government may have certain rights in this invention as provided by the terms under NREL Subcontract No. ZCB-4-13032-02, Prime Contract No. DEAC36-83CH10093 awarded by the Department of Energy.

TECHNICAL FIELD

The present invention relates to sensors that measure through the voltage induced by the time rate change of flux linkage in a sensing coil.

BACKGROUND ART

Sensors that measure through the voltage induced by the time rate of change of flux linkage in a sensing coil are susceptible to the corruption of their output voltage signal by stray or undesirable magnetic fields linking with the sensing coil. These types of sensors are typically used in electric machine speed sensing, crank shaft position sensing, cam shaft position sensing, input shaft transmission speed sensing, vehicle speed sensing and a.c. current sensing.

One solution for eliminating the effects of stray magnetic fields on the sensing coil would be to eliminate or decouple the voltage produced by the stray magnetic fields from the sensor output voltage using a computer, DSP, or even analog circuitry. However, matching the voltage produced by the stray magnetic field to sufficiently reduce their effects is extremely difficult.

Therefore, there is a need for a new and improved system and method for canceling the effects of stray magnetic fields on sensing coils. The new and improved system and method must cancel the effects of stray magnetic fields on the sensing coil without the need for complex circuitry or signal processing. Additionally, the new and improved system and method must also have packaging flexibility.

DISCLOSURE OF INVENTION

In accordance with an aspect of the present invention, a sensor system for sensing a rotation of a sensing wheel is provided. The sensor system has a sensing coil in juxtaposition with the sensing wheel. Moreover, the sensing coil has a sensing coil output signal indicative of the rotational speed of the sensing wheel. Further, a cancellation coil is located remotely from the sensing coil and connected in series with the sensing coil. Additionally, the cancellation coil has a cancellation coil output signal indicative of an environmental disturbance which is effecting the sensing coil output signal. The cancellation coil output signal operates to cancel the effects of the environmental disturbance on the sensing coil output signal.

In accordance with another aspect of the present invention, the sensing coil further comprises a permanent magnet.

In accordance with still another aspect of the present invention, the sensing coil further comprises a pole piece.

In accordance with still another aspect of the present invention, the cancellation coil further comprises a pole piece.

In accordance with still another aspect of the present invention, the cancellation coil is in juxtaposition with the sensing wheel.

In accordance with still another aspect of the present invention, the sensing wheel includes at least one tooth.

In accordance with still another aspect of the present invention, the cancellation coil is in axial alignment with the at least one tooth on the sensing wheel.

In accordance with still another aspect of the present invention, the cancellation coil is located an integer number of teeth away from the sensing coil.

In accordance with still another aspect of the present invention, the cancellation coil is located an integer number of electrical machine poles away from the sensing coil.

In accordance with still another aspect of the present invention, the cancellation coil is in axial alignment with the sensing coil.

In accordance with yet another aspect of the present invention, a method for canceling the effects of stray magnetic fields on a sensor system that senses a rotation of a sensing wheel includes sensing the rotation of the sensing wheel using a sensing coil, wherein the sensing coil has a sensing coil output signal indicative of the rotational speed of the sensing wheel. Further, an environmental disturbance which is affecting the sensing coil output is sensed using a cancellation coil located remotely from the sensing coil and connected in series with the sensing coil. Moreover, the cancellation coil has a cancellation coil output signal indicative of the environmental disturbance. The cancellation coil output signal cancels the effects of the environmental disturbance on the sensing coil output signal.

The above features, benefits and advantages and other features, benefits and advantages of the present invention are readily apparent from the following detailed description of the best mode for carrying out the invention when taken together with the accompanying drawings.

BRIEF DESCRIPTION OF DRAWINGS

FIG. 1 is a schematic diagram illustrating a typical use for a variable reluctance sensor and associated environment, in accordance with the present invention;

FIG. 4 is a schematic diagram illustrating the placement of a sensing coil and a cancellation coil with respect to each other and to a sensing wheel, in accordance with the present invention;

FIG. 6 illustrates the electrical connection between the sensing coil and the cancellation coil, as well as placement of the cancellation coil in juxtaposition with a tooth on the sensing wheel, in accordance with the present invention.

BEST MODE FOR CARRYING OUT THE INVENTION

Referring now to FIG. 1, a typical environment in which variable reluctance sensors are disposed is illustrated, in accordance with the present invention. Rotational speed sensor 10 is a variable reluctance sensor having a sensing coil 12, a pole piece 14, and a permanent magnet 16.

Figure 2:
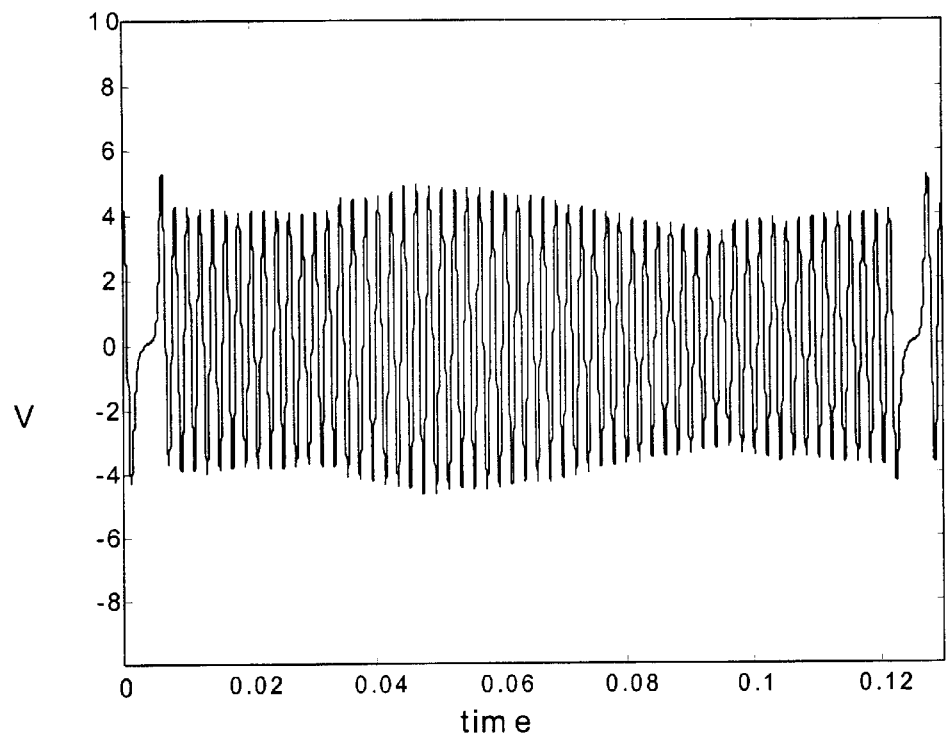
FIG. 2 is a sensing coil output voltage versus time plot for the rotational speed sensor without the presence of stray magnetic fields, in accordance with the present invention.

Rotational speed sensor 10 is placed in close proximity to a sensing wheel 18 having a plurality of teeth 20. The sensing wheel 18, in this example, is rotatably attached to a motor shaft of a motor 22. Sensing wheel 18 rotates with the rotation of the shaft of motor 22 and causes a change in the magnetic flux pattern created by permanent magnet 16. The changing flux pattern induces a voltage in sensing coil 12, providing a sensing coil output signal indicative of the position and rotational speed of the shaft, as well known in the art. A typical sensing coil output voltage versus time plot for the rotational speed sensor without the presence of stray magnetic fields is shown in FIG. 2.

Figure 3:
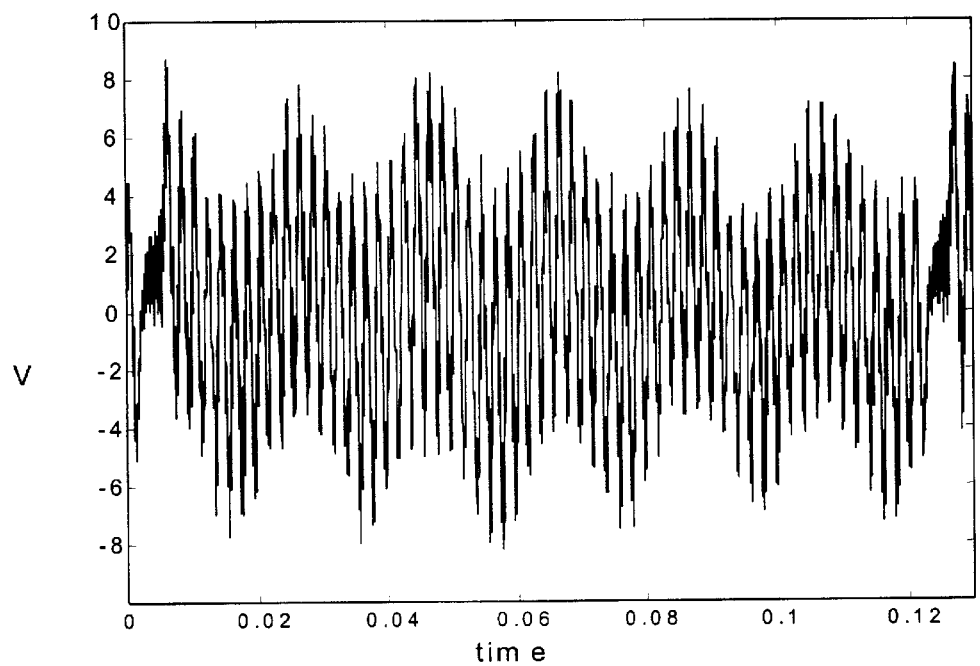
FIG. 3 is a sensing coil output voltage versus time plot for the rotational speed sensor in the presence of stray magnetic fields, in accordance with the present invention.

With continuing reference to FIG. 1, an operational environment for rotational speed sensor 10 is further shown, in accordance with the present invention. In this instance, packaging constraints required rotational speed sensor 10 to be located adjacent a starter/alternator induction machine 24 having stator end turns 26. The stray magnetic fields produced by induction machine 24 corrupt the sensing coil output signal causing signal distortion. A typical sensing coil output voltage versus time plot for the rotational speed sensor, wherein the output voltage signal is corrupted by stray magnetic fields produced by induction machine 24, is shown in FIG. 3.

Referring now to FIG. 4, the sensor system of the present invention includes rotational speed sensor 10 in electrical communication with a cancellation sensor 30 as illustrated. Cancellation sensor 30 is connected in electrical series with the rotational speed sensor 10. Cancellation sensor 30 includes a cancellation coil 32 and a cancellation coil pole piece 34. Essentially, cancellation sensor 30 is a variable reluctance sensor of the same type as rotational speed sensor 10 without the permanent magnet 16.

Figure 5:
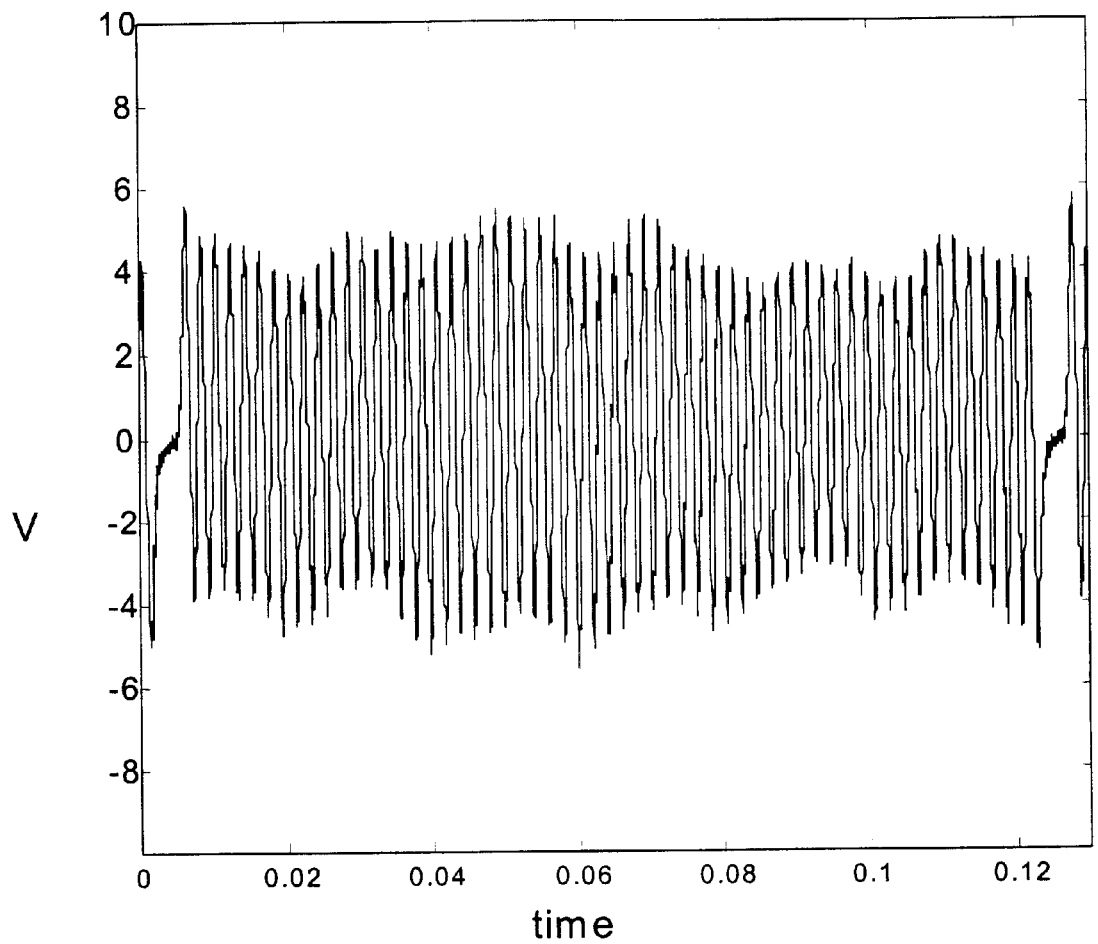
FIG. 5 is a sensing system output voltage versus time plot for the rotational speed sensor and cancellation sensor connected in series, in the presence of stray magnetic fields, in accordance with the present invention.

Stray magnetic fields that envelop both rotational speed sensor 10 and cancellation sensor 30 induce voltages in both coils. However, rotational speed sensor 10 has an additional voltage induced by the rotation of sensing wheel 18, as shown in FIG. 2 and described above. Connecting cancellation sensor 30 in series with rotational speed sensor 10 cancels the voltage produced by the stray magnetic fields from the sensor coil output signal. This provides a sensor system output signal, as shown in a sensor system output voltage versus time plot of FIG. 5, that is more representative of the rotation of sensing wheel 18 and has a significantly improved (cleaner) signal quality as compared with the corrupted sensing coil output signal shown in FIG. 3.

In an embodiment of the present invention, cancellation sensor 30 is placed at an integer number of sensing wheel teeth away from rotational speed sensor 10. The placement of cancellation sensor 30, in axial alignment with a tooth 20 of sensing wheel 18, provides a closer match of the induced voltage in sensing coil 12 produced by stray magnetic fields by creating a similar flux linkage path as produced between rotational sensor 10 and sensing wheel 18. Thus, an even cleaner sensor system output voltage is produced having minimal distortion across terminals 36 and 38.

Referring now to FIG. 6, an alternate embodiment of the sensor system of the present invention is illustrated. To further enhance the voltage signal matching ability of cancellation coil 30, cancellation coil 30 is placed at an integer number of electrical machine poles away from the rotational sensor 10. This placement of cancellation sensor 30, as illustrated in FIG. 3, provides an enhanced voltage signal matching capability, as well as packaging flexibility.

While the best mode for carrying out the invention has been described in detail, those familiar with the art to which this invention relates will recognize various alternative designs and embodiments for practicing the invention as defined by the following claims.

What is claimed is:

1. A sensor system comprising:
    a sensing wheel having a plurality of teeth;
    a sensing coil in juxtaposition with the sensing wheel, wherein the sensing coil has a sensing coil output signal indicative of the rotational speed of the sensing wheel; and
    a cancellation coil located remotely from the sensing coil, radially spaced an integral number of teeth from the sensing coil and connected in series with the sensing coil, wherein the cancellation coil experiences a flux linkage path produced between the sensing coil and an environmental disturbance affecting the sensing coil allowing the cancellation coil to detect the environmental disturbance in order to reduce the effects of the environmental disturbance on the sensing coil output signal.

2. The sensor system of claim 1 wherein the sensing coil further comprises a permanent magnet.

3. The sensor system of claim 1 wherein the sensing coil further comprises a pole piece.

4. The sensor system of claim 1 wherein the cancellation coil further comprises a pole piece.

5. The sensor system of claim 1 wherein the cancellation coil is in juxtaposition with the sensing wheel.

6. The sensor system of claim 1 wherein the cancellation coil is in axial alignment with one of the plurality of teeth on the sensing wheel.

7. The sensor system of claim 1 wherein the cancellation coil is located an integer number of teeth away from the sensing coil.

8. A sensor system comprising:
    a sensing wheel having a plurality of teeth;
    a sensing coil in juxtaposition with the sensing wheel, wherein the sensing coil has a sensing coil output signal indicative of the rotational speed of the sensing wheel; and
    a cancellation coil located remotely from the sensing coil, radially spaced an integral number of teeth from the sensing coil and connected in series with the sensing coil to reduce the effects of the environmental disturbance on the sensing coil output signal;
    wherein the sensor system is positioned near an electrical machine having a plurality of electrical machine poles, wherein the sensing coil is positioned near one of the plurality of electrical machine poles, and wherein the cancellation coil is located an integer number of electrical machine poles away from the sensing coil.

9. The sensor system of claim 1 wherein the cancellation coil is in axial alignment with the sensing coil.

10. A method for canceling the effects of stray magnetic fields on a sensor system for sensing rotation of a sensing wheel having a plurality of teeth, the method comprising:
    sensing the rotation of the sensing wheel using a sensing coil, wherein the sensing coil has a sensing coil output signal indicative of the rotational speed of the sensing wheel; and
    sensing an environmental disturbance affecting the sensing coil output using a cancellation coil located remotely from the sensing coil and radially spaced an integral number of teeth from the sensing coil allowing the cancellation coil to experience a flux linkage path produced between the sensing coil and an environmental disturbance affecting the sensing coil, the cancellation coil connected in series with the sensing coil and generating a cancellation coil output signal indicative of the environmental disturbance to reduce the effects of the environmental disturbance on the sensing coil output signal.

11. The method of claim 10 wherein the sensing coil further comprises a permanent magnet.

12. The method of claim 10 wherein the sensing coil further comprises a pole piece.

13. The method of claim 10 wherein the cancellation coil further comprises a pole piece.

14. The method of claim 10 further comprising placing the cancellation coil in juxtaposition with the sensing wheel.

15. The method of claim 10 further comprising placing the cancellation coil at least one tooth away from the sensing coil.

16. A method for canceling the effects of stray magnetic fields on a sensor system for sensing rotation of a sensing wheel having a plurality of teeth, the method comprising:

sensing the rotation of the sensing wheel using a sensing coil, wherein the sensing coil has a sensing coil output signal indicative of the rotational speed of the sensing wheel; and sensing an environmental disturbance affecting the sensing coil output using a cancellation coil located remotely from the sensing coil and radially spaced an integral number of teeth from the sensing coil, the cancellation coil connected in series with the sensing coil and generating a cancellation coil output signal to reduce the effects of the environmental disturbance on the sensing coil output signal;

wherein the sensor system is placed near an electrical machine having a plurality of electrical machine poles, the method further comprising placing the cancellation coil an integer number of electrical machine poles away from the sensing coil.

17. The method of claim 10 further comprising placing the cancellation coil in axial alignment with the sensing coil.

* * * * *